United States Patent [19]

Morley et al.

[11] 4,400,405

[45] Aug. 23, 1983

[54] DIETETIC FROZEN DESSERT FOOD

[75] Inventors: Robert G. Morley, Stone Mountain; W. Ronald Ashton, Duluth, both of Ga.

[73] Assignee: Landwide Foods, Inc., Dover, Mass.

[21] Appl. No.: 228,550

[22] Filed: Jan. 26, 1981

Related U.S. Application Data

[63] Continuation-in-part of Ser. No. 210,846, Nov. 26, 1980, Pat. No. 4,346,120.

[51] Int. Cl.$^3$ ............................................. A23G 9/02
[52] U.S. Cl. .................................. 426/565; 426/804; 426/567
[58] Field of Search ................ 426/565, 566, 567, 804

[56] References Cited

U.S. PATENT DOCUMENTS

| 1,445,200 | 2/1923 | Bullard et al. | 426/565 |
| 1,659,723 | 2/1928 | Cosler | 426/565 |
| 1,781,249 | 11/1930 | Scholl | 426/569 |
| 1,878,203 | 9/1932 | Turnbow | 426/654 |
| 2,139,836 | 12/1938 | London | 99/136 |
| 2,168,934 | 8/1939 | Haskins et al. | 99/136 |
| 2,558,453 | 6/1951 | Minster | 99/136 |
| 2,738,279 | 3/1956 | Stimpson et al. | 99/136 |
| 3,479,187 | 11/1969 | Arbuckle | 99/60 |
| 3,535,122 | 10/1970 | Mussellwhite et al. | 99/136 |
| 3,647,472 | 3/1972 | Speech et al. | 99/34 |
| 3,702,768 | 11/1972 | Finucane | 426/566 |
| 3,826,829 | 7/1974 | Marulich | 426/190 |
| 3,845,223 | 10/1974 | Moneymaher | 426/566 |
| 3,897,571 | 7/1975 | Homler et al. | 426/327 |
| 3,949,102 | 4/1976 | Hellyer | 426/565 |
| 3,993,793 | 11/1976 | Finney | 426/565 |
| 4,145,454 | 3/1979 | Dea et al. | 426/565 |
| 4,146,652 | 3/1979 | Kahn et al. | 426/564 |
| 4,154,863 | 5/1979 | Kahn et al. | 426/553 |
| 4,178,390 | 12/1979 | Igoe | 426/565 |
| 4,199,604 | 4/1980 | Kahn et al. | 426/327 |
| 4,199,605 | 4/1980 | Kahn et al. | 426/330.6 |

FOREIGN PATENT DOCUMENTS 1508437  4/1978  United Kingdom ................ 426/565

OTHER PUBLICATIONS

Arbuckle, W. S., PhD., *Ice Cream, Second Edition*, Avi Publishing Co., Inc., Westport, Conn. (1972).
Glicksman, Martin (General Foods Corp.) "Hydrocolloids" pp. 2-1 through 2-25.
Ross, O. E. (National Pectin Products Company, Chicago, Illinois), "Sherberts for Tomorrow's Markets", pp. 1-3.
"Distinctive Desserts, The New Soft-Serve Recipe Book From Taylor Freezer", ©1971 by Taylor Freezer, Rockton, Illinois.
Sommer, Hugo H., Ph.D., "The Theory and Practice of Ice Cream Making", Sixth Edition, 1951, published by the author, Madison, Wis.

*Primary Examiner*—Jeanette M. Hunter
*Attorney, Agent, or Firm*—Lahive & Cockfield

[57] ABSTRACT

A whipped frozen dietetic dessert product coneable and extrudable as conventional soft serve ice cream at the temperatures of 0° F.–15° F. has a low fat content, 100% overrun and a water content of 53 to 60%.

14 Claims, 1 Drawing Figure

DIETETIC FROZEN DESSERT FOOD

BACKGROUND OF THE INVENTION

This application is a continuation-in-part of application Ser. No. 210,846, filed Nov. 26, 1980 now U.S. Pat. No. 4,346,120. A related application, also a continuation-in-part of application Ser. No. 210,846 is being filed on even date herewith.

This invention provides a new dietetic frozen food product, principally for dessert use, that emulates features of soft serve ice cream but at such lower temperatures as to be suitable for prolonged storage in store and home freezers. The dietetic feature of the food product is that it is at least essentially free of fat and hence has only a low level of calories and of cholesterol. The invention embraces a composition of ingredients and processing steps which provide the new frozen dietetic food product.

Soft serve ice cream, or simply soft serve, is a highly popular dessert with wide appeal. The soft serve industry has grown to such an extent that it is recognized as a distinct segment of the frozen dessert field and encompasses manufacturers and retailers of soft serve products, and suppliers of processing equipment for the product.

Distinguishing features of conventional soft serve are that it is frozen in a special soft serve freezer, is dispensed by extrusion at carefully chosen sub-freezing temperatures and stands up on a cone or dish upon extrusion. Soft serve generally is consumed almost immediately after extrusion from the soft serve freezer and hence essentially at the extrusion temperature.

Although soft serve of this character has been marketed for many years, it is still available only from stores having special freezers that dispense the product for immediate consumption. This is because the product generally is dispensed at temperatures between 16° F. and 21° F. ($-9°$ C. to $-6°$ C.). At lower temperatures, the product is no longer sufficiently soft. Conventional soft serve accordingly is not suited for sale from grocery store freezers for home storage and dispensing. Home freezers maintain temperatures generally around 0° F. to 10° F. ($-18°$ C. to $-12°$ C.), and store freezers, which as used herein includes grocery store, supermarket, and restaurant freezers, are generally at colder temperatures.

Others have expended considerable effort to develop a soft serve product for home use, but apparently without success. U.S. Pat. Nos. 4,146,652; 4,154,863; 4,199,605; 4,199,604, 4,145,454; and 3,993,793 and U.K. Patent Specification No. 1,508,437 disclose frozen food products which supposedly are softer than usual at freezer temperatures. However, none is understood to provide a soft serve-like product for home consumption suitable for purchase from a store freezer and storage in a home freezer. There is considerable other published art on the subject of frozen desserts, particularly ice cream. A recent text is *Ice Cream, Second Edition* by W. S. Arbuckle, Ph.D., published in 1972 by the Avi Publishing Company, Inc., Westport, Conn.

It is accordingly an object of this invention to provide a dietetic soft serve dessert product suited for home freezer storage.

It is a further object of the invention that the food product be suited for storage in a home freezer and for dispensing by extrusion directly after removal from that freezer.

The invention accordingly seeks to provide a dietetic frozen food product which emulates features of conventional soft serve at the significantly lower temperatures standard in home freezers.

Other objects of the invention will in part be obvious and will in part appear hereinafter.

The invention accordingly comprises a frozen product possessing the features, the properties, and the relation of components which will be exemplified in the dessert product hereinafter described, and the several steps and the relation of such steps with respect to each of the others as exemplified in the process hereinafter set forth. The scope of the invention is indicated in the claims.

BRIEF DESCRIPTION OF DRAWING

For a fuller understanding of the nature and objects of the invention, reference should be made to the following detailed description and the accompanying drawing, which is a graphical representation of yield strength, i.e. stress, as a function of temperature for a fat-containing product related to the low fat product of the invention and for three prior frozen dessert products.

THE INVENTION

Figure 1:
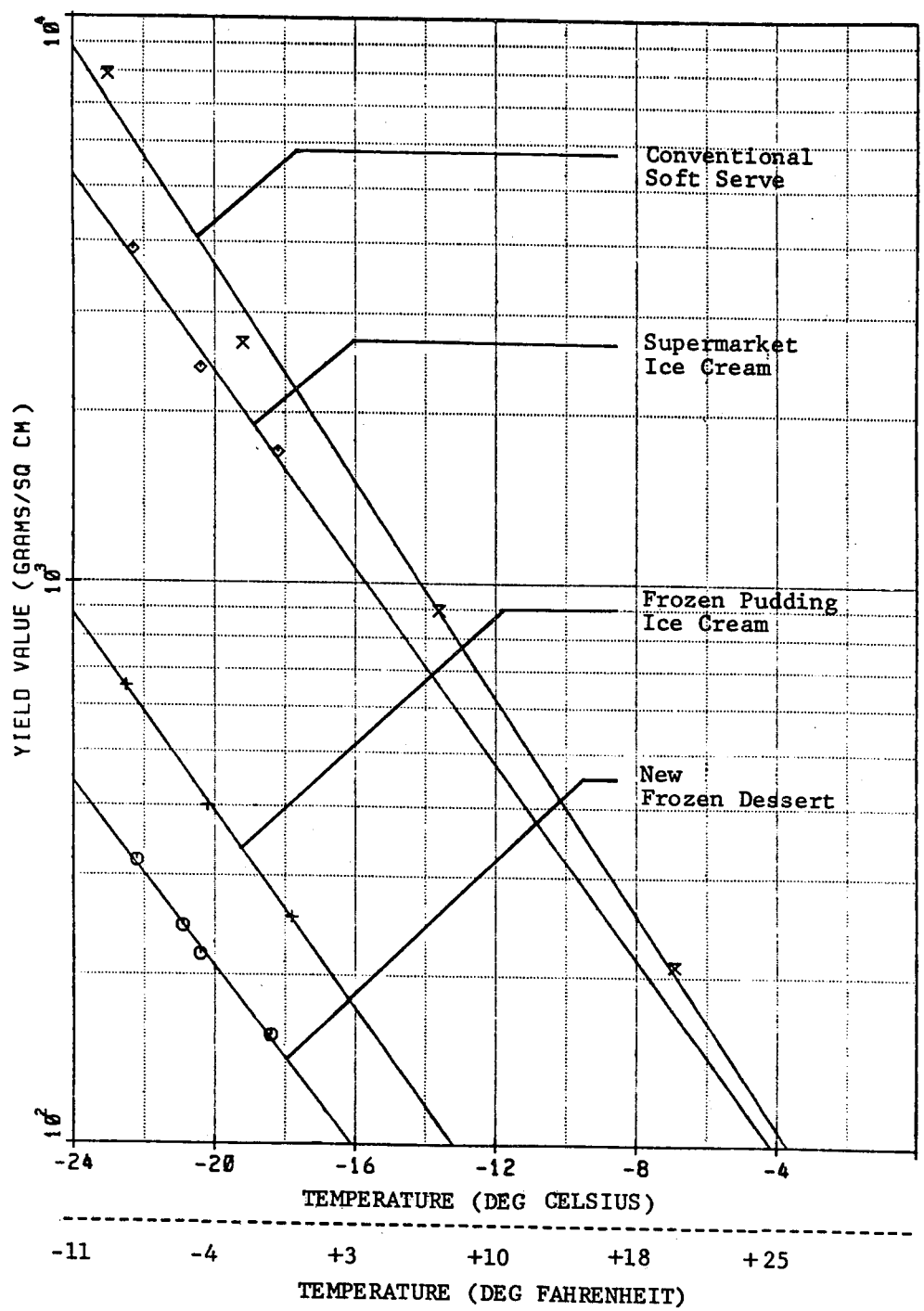

The frozen dietetic food of this invention provides both soft serve-like perception and serving properties directly from a home freezer, and a low fat level. The food product hence is low in calories and has only a low level of cholesterol. The product can be prepared without any ingredient that has primarily a fat-introducing function. It is accordingly believed that the frozen dietetic product can, at least theoretically, be formulated with zero fat content. In practice, the dietetic product has a finite level of fat, typically under one percent by weight, where desired. This level results from the fat present, for example, in the commercial skim milk used as a protein ingredient and present in emulsifying ingredients. The dietetic product accordingly may be termed a low-fat food, and this term is used herein to encompass a fat level down to and including zero percent.

The features of conventional soft serve which are important to consumers include the organoleptic properties of taste, after taste, and mouth feel. Many of these are subjective properties and hence not readily measured or quantified. For example, one important taste which has been difficult to attain in a frozen dessert which is soft enough for extrusion at home freezer temperatures is the absence of a burning sensation. Features of standard soft serve also include the ability to be extruded, particularly as a substantially continuous ribbon or rod, and to be coiled on itself in a conical beehive-like manner. Standard soft serve in addition is to retain the extrudate shape, and have the ability to stand up in a cone or dish without sagging, sufficient body strength so as not to slip or fall sideways when the cone or dish tips, and the proper bite resistance so that the consumer can either lick the product or bite and chew it with a satisfactory mouth feel. The soft serve is to retain these latter properties, in addition to resistance to melting and dripping, for a sufficient time—typically ten minutes at room temperature e.g. 68° F.—until the serving is eaten.

Other properties of a frozen dessert that is to be sold in a grocery store for home storage and dispensed by extrusion, include prolonged storage life without deterioration, whether visible or taste perceptable. The product is also to resist thermal shock, i.e. resist deterioration when subjected to varying temperatures. Temperature variations occur normally in a freezer as the equipment cycles, especially through frost-free operation. An extreme thermal shock occurs when the product is warmed to a near melting temperature and then rechilled to a freezer temperature, as can occur during transfer of the product from the store freezer to the home freezer.

Stated more technically, a frozen soft serve dessert that can be dispensed by extrusion requires deformation and flow properties, i.e. rheological characteristics, that enable the frozen product, when subjected to reasonable extrusion forces, to become sufficiently fluid to flow through the extrusion nozzle. This performance involves the rheological characteristic termed shear thinning. The extrudate is to be a continuous rod or ribbon. The extruded product, however, must essentially immediately set-up, i.e. lose the shear-resonsive fluidity, in order to retain the extrudate shape and to stand up on a cone or dish. Yet the extruded product preferably is to be sufficiently bendable upon extrusion to be coiled on itself, as noted for conventional soft serve. These characteristics of the frozen dessert product may collectively be termed coneability. Commercial soft serve is coneable, in that it can be extruded with a rod-like shape and immediately coiled in sequential layers on a cone or dish to provide a spiraled serving that tends to retain its shape.

The attaining of this performance with a product at home freezer temperatures requires flow properties different from those of conventional soft serve. They are also different from those of regular ice cream, which cannot be dispensed by extrusion when at home freezer temperatures, but rather requires, as known, scooping or dipping with a tool.

Properties of the frozen material important to attaining the foregoing extrudability and coneability include yield value at the desired extrusion temperature, viscosity, shear thinning value at the extrusion temperature and shear rate, relaxation time, and lateral resistance.

Yield value is a measure of the material strength, and particularly the resistance to deformation and flow, as determined, for example, from measurements made with a cone penetrometer. A moderate yield value is desired, at home freezer temperatures, in order that the product be extrudable using hand pressure.

A material with too high a yield value is unduly hard to extrude. Too low a value means the material is unduly soft, will flow too readily, and the extrusion may be difficult to control. The yield value which this invention attains is similar, at freezer temperatures as low as on the order of 0° F., to that of conventional soft serve at around 18° F., and may be less but is not appreciably higher.

Viscosity is a property of fluids which relates to resistance to flow. A relatively high viscosity, e.g. significant stiffness, is desired in the absence of an applied extrusion pressure, for the material to be coneable. On the other hand, a relatively low viscosity is desired for ease in extrusion when the material is under a manually-applied pressure and for ease in bending the extrudate into layered coils on a dish or cone.

Shear thinning value is of significance in determining the rate at which a material flows under particular conditions. It concerns the relative drop in viscosity of the material which occurs upon extrusion. Under defined conditions of temperature and orifice size, the shear thinning value is significant in determining the extrusion rate of the product when subjected to a given shear stress. This in turn, is important in determining the speed and the ease with which a serving portion can be extruded.

Relaxation time is the time, typically in seconds, for the dessert product to set up after extrusion at the specified temperature. It is measured as the time required for the yield value of the frozen dessert to return to 63.2% of its pre-extrusion value after removal of the pressure which induced the extrusion flow. The relaxation time is to be sufficiently long to allow each successive coiled layer of the extruded dessert to form and to bond to another layer, but short enough so that a cone of the material can be handled, and even tipped, promptly after being dispensed.

Lateral resistance is the elastic strength of the material to resist deformation. The lateral resistance important in the context of this invention can be measured as the force necessary to bend permanently a cylindrical or other rod-shaped extrudate of the frozen product, with given dimensions, at the extrusion temperature. This lateral resistance hence identifies the ability of an extruded conical serving of the product to maintain the extruded shape, e.g. to resist deflection and bending, and for layers of the product to stand up in tiers.

It has been found that a new soft serve dessert product which is essentially free of fat can be formulated and prepared and which appears to satisfy at least many of the foregoing objectives and criteria. The product is prepared ready for consumption and packaged for a consumer to purchase from a store freezer. The consumer stores the product in a home freezer, which as used herein includes the freezer section of a home refrigerator, and dispenses the dessert product directly from the package for consumption. The product preferably is in a package which can be manipulated to extrude the frozen product under hand pressure to yield a serving which is essentially the same in appearance, as well as in taste, as conventional soft serve dispensed from a soft serve freezer. The new food product additionally appears to have sufficient stability during storage to be capable of commercial distribution.

The frozen dessert product of the invention is formulated without a fat constituent. It hence only requires ingredients which provide protein, water and flavor constituents common in frozen desserts, together with unique multi-ingredient sugar, stabilizer and emulsifier systems. The attainment with these ingredients, but without a fat constituent, of fine taste and pleasing mouth feel, and the exacting rheological properties required for a household frozen soft serve dessert is deemed unexpected and not predictable.

One particular feature of the new findings is a dietetic frozen dessert that has both unusually low specific gravity and substantial body and chewiness. The formulation of the new product enables it to be whipped with significantly more air than is common for ice cream, and thereby to attain the desired low specific gravity. The ice cream and the soft serve industries describe the amount of air in a product as overrun. This term measures the percentage by which the volume of the liquid mix for a product is increased during whipping and freezing. Thus, when one gallon of mix produces two gallons of finished product, the overrun is 100%.

The overrun of the soft serve product of this invention typically lies between 100% and 200%. The latter value is twice the overrun normally found in regular ice cream and is approximately four times the 40-60% overrun common for conventional soft serve. It is understood that neither regular ice cream mix nor conventional soft serve mix can take 200% overrun and remain appetizing. By contrast, the new product is appetizing. In fact, the body, texture and mouth feel of the new product have been judged to be acceptable and satisfactory for a dietetic product.

Another particular feature of these findings is a frozen dessert that is essentially free of "burn". Consumers have identified this perception of a burning sensation on the tongue and in the throat as a serious drawback of products with depressed freezing points. It is believed that the sensation is due to dehydration caused by the additional sugars commonly used as freezing-point depressants. The prior heavy use of sugars also has caused a cloying sweetness.

The new frozen dessert attains significant freezing point depression without a significant burn sensation and without undue sweetness. The invention attains these distinct advantages by combining a unique sugar system with the relatively high overrun. Separate consumer tests have confirmed that the resultant new dessert indeed has the proper sweetness and a pleasing, burn-free after taste.

A feature of the ingredients of the dietetic food is that there is no fat constituent such as is typically employed to aid in providing the creamy taste, smoothness, body, and eating characteristic associated with ice cream-like desserts.

The ingredients are now described further, beginning with the more common ones. The amount and, to lesser extent, the character of each constituent depends in part on other of the constituents.

A specific function of protein in the new dessert product concerns attaining high overrun. A formulation with insufficient protein does not whip well and hence is considered deficient in holding the desired overrun. An excessive protein constituent, in contrast, results in a mixture that is unduly thick and does not process well with conventional equipment.

The preferred source of the protein constituent of the new dessert product is milk solids not fat (MSNF). Milk solids not fat used in the preferred composition according to the invention aid in providing the desirable properties of whipping ability, smoothness, body, mouth feel, melt resistance, lowering of freezing point, and some sweetness. The MSNF content can be derived from skim milk, condensed skim milk, and non-fat dry milk, or solely from non-fat dry milk with the addition of water. Other protein sources with which it is believed the invention can be practiced, generally as substitution for a portion of the MSNF, include milk derived solids such as sweet dairy whey, neutralized acid whey, modified whey, whey protein concentrate, casein, modified casein, sodium caseinate, and calcium caseinate; and further include soy flour, modified soy flour, soy protein concentrate, soy isolate, egg protein (yolk and/or white), peanut flour, and peanut protein concentrate. The protein constituent generally accounts for approximately 3% to 7% by weight of the new dessert, with 5% considered preferable.

Water is present in the new dessert product as a dispersion medium for the other ingredients of the emulsified product. The portion of water in the product which remains unfrozen, due to the freezing point depression caused by sugars, provides fluidity for the product. Moreover, the portion of water which does freeze forms ice crystals that give the product rigidity as well as the refreshing taste perception characteristic of a frozen dessert. An excessive water level, relative to the sugar level, is understood to affect adversely the rheological properties of the product and to give it excessive iciness. An insufficient water level also affects adversely the desired rheological properties.

The water content of the new dessert which the invention provides generally constitutes from 53% to 60% by weight of the product, including the water present in other ingredients, e.g. skim milk. This corresponds to a level of total solids between 47% and 40%. Water preferably constitutes around 57% of the product.

The flavoring constituent of the new soft serve dessert is selected from known flavoring ingredients according to the desired taste, taking into account the other ingredients. This constituent includes, by way of illustration, cocoa, fruits, nuts, and the like as well as other flavorings, both natural and artificial. Note, however, that the ingredient ranges specified herein, unless stated otherwise, are for an unflavored product and for a product flavored with a concentrate, e.g. vanilla, present in only a small amount by weight. Those skilled in the art will comprehend the adjustments appropriate for the particular flavoring used.

The sugar constituent of the new soft serve dessert is a combination of saccharides that provides simultaneous control of freezing point depression, sweetness, body and texture, and flavor. The combination of saccharides which the invention provides depresses the product freezing point for the desired extrusion. Too much saccharide or an unsuitable saccharide combination can cause the product to be too soft, unduly sweet, and to have a burning taste sensation. An insufficient or unsuited saccharide constituent can allow an excessive proportion of water to freeze with the result that the product does not extrude satisfactorily at the relatively low temperature of interest.

The effects in ice creams of added saccharides in contributing to sweetness and in lowering freezing point are known at least in general terms, but the provision of a sugar system that provides a simultaneous blend of organoleptic and material properties required for a household soft serve dessert is considered to be novel. The added sugar to attain these objectives, i.e. in addition to sugars present in the milk solids and other constituents of the product, at least includes the range of 25-29%, with 27% being preferred. Typically the added sugars plus the sugar in milk solid ingredients constitutes on the order of 32% by weight of the product.

The saccharide system of the invention, which as noted is considered important in providing a frozen dessert having no significant perception of burn, preferably has fructose, sorbitol and corn syrup as at least the major sugar ingredients. The corn syrup considered preferable is 36 DE (dextrose equivalent) or lower. The sugar system may, however, employ other saccharides, depending at least in part on the subjective properties desired for the final product. Suitable other sugars may include sucrose, dextrose, mannitol, other corn syrups including high fructose corn syrups, starch hydrolysates, invert sugars, honey, and xylitol. It has, for example, been found that dextrose can replace all or part of the sorbitol, but generally a less desirable flavor results, in particular a burning sensation is experienced upon total replacement. A similar but lesser problem has been experienced by replacing sorbitol with high fructose corn syrup.

It is understood that sugar systems employing a combination of sorbitol and fructose have heretofore been used in certain diabetic ice creams, which of course have significantly different mechanical properties from a soft serve dessert. It further is understood, however, that this prior sugar system did not also employ corn syrup, as found in the practice of the present invention. It also is understood that the new soft serve dessert of this invention employs a significantly larger added sugar constituent than known diabetic ice cream.

The stabilizer constituent of the invention also contributes to the attainment of the desired performance features of the new household dessert. It is selected to improve the ability of the product to withstand commercial shelf life and substantial heat shock without undue deterioration, and yet enable the product to hold the overrun, which typically exceeds 100%, and to maintain a perception that is free of an undesirable gummy or slimy character. The stabilizer element of the invention contributes to the attainment of these and other objectives for the product by providing a combination of stabilization, gelling and blocking functions. It preferably also provides a protective colloid function.

The stabilizing constituent of the invention typically is in the range between 0.7% to 1.5% by weight of the entire product. The amount varies however with factors including the amount of water and the strength of the stabilizers employed. It is hence considered that features of the invention can be realized with a stabilizer constituent having a broader range.

In one practice of the invention the stabilizer system employs at least one stabilizer from each of at least three groups of stabilizers, namely stabilizing gum, i.e. water-binding gums, gelling agents, and insoluble blocking agents. The water-binding gums are present in a range generally between 0.12% and 0.4% and are selected from locust bean gum, guar gum, propylene glycol alginate, tara gum, sodium carboxymethyl cellulose (CMC), and other cellulose ethers such as methylcellulose, hydroxypropylcellulose and hydroxypropylmethyl cellulose. The amount of gelling agent also varies with several factors, as those skilled in the art will recognize, and by way of example is present, with common food-grade agents, in an amount generally ranging between 0.2% and 0.5% of the total product and is selected from gelatin, xanthan gum, carrageenan, sodium alginate and pectin. Where it is desired that the product include a wheying-off (syneresis) protective agent, i.e. a protective colloid, the gelling agent carrageenan can additionally provide this function. The blocking agent is present in an amount generally within 0.1% and 1.0% of the total product. Preferred examples of blocking additives, in addition to the blocking function other noted stabilizers provide, are microcrystalline cellulose and cellulose fibers.

A stabilizer system considered preferable for practice of the invention consists essentially of a combination of locust bean gum, guar gum, gelatin, carrageenan and microcrystalline cellulose. Those skilled in the art will recognize that each group of stabilizers is denominated herein by a primary function, although stabilizing ingredients typically have multiple functions. For example, gelatin can serve both as a water-binding gum and as a gelling agent; and xanthan can serve as a water-binding gum alone or, additionally, as a gelling agent in combination with locust bean gum. Further, in a preferred practice, carrageenan is classified above as a gelling agent although it is also a water-binding gum and provides a protective-colloid function. Hence others skilled in this art of food additives may practice the invention with other stabilizing systems within the scope of these teachings.

The proper emulsifier constituent for practice of the invention controls the degree of emulsification of the product during manufacture to aid in attaining coneability, and, it is understood, extrudability. Insufficient emulsifying agent can cause the product not to stand up upon extrusion. The emulsifier constituent also serves as both a whipping agent and a drying agent in the new dessert product.

The emulsifier constituent of the invention is in most instances present in the range between 0.4% to 1.2% of the total product. In at least a preferred instance, the emulsifier ingredients can be whipping agents such as mono- and diglycerides and distilled monoglycerides, and drying agents such as polysorbate 80, polysorbate 65, and ethoxylated mono- and diglycerides. These are considered illustrative of other food-grade emulsifiers with which the invention may be practiced.

An emulsifier system found preferable for practice of the invention is a combination of mono- and diglycerides, polysorbate 80 and distilled monoglycerides.

In addition to the foregoing ingredients, the household soft serve dessert of the invention can include other food-grade ingredients, non-limiting examples being lower chain monohydric and polyhydric alcohols, starches, inorganic salts, and pH buffering agents.

The preparation of the soft serve dessert according to the invention employs processing equipment conventional for ice cream, both hard and conventional soft serve, but as set forth below differs from the overall conventional processing. The ingredients are first combined and well mixed, typically by continuous stirring as the ingredients are introduced. The mixed combination is heated as required for pasteurization and to heat treat certain ingredients. In particular, the heating places those stabilizers which are insoluble in cold water into water solution, liquifies any fatty material present, and hydrates proteins. The heat treatment preferably employs a relatively low pasteurization temperature, e.g. maintaining the combination at 155° F. for thirty minutes, but can be carried out at higher temperatures for correspondingly shorter times up to on the order of 300° F. for two seconds. The lower temperature heat treatment is considered preferable to attain better taste in the resultant dessert product.

The heated ingredients are homogenized to form a liquid-in-liquid emulsion, typically with the commonly-used two-stage homogenizing equipment. The emulsion typically is dilute, in that water is present in greater volume than other liquid ingredients, at least one of which generally is an emulsifier. This equipment is preferably operated with an homogenization pressure in the first stage on the order of 2,000 psi and a second stage pressure on the order of 500 psi. These pressures, however, are not considered critical, and other homogenizing pressures can be used.

The homogenized mixture is cooled as required to complete pasteurization. It is considered preferable that the homogenized mixture be cooled at least to 70° F. quickly after homogenization. The further cooling can occur thereafter. This prompt initial cooling maintains a manageable viscosity in the mixture, so that it can be processed without clogging or plugging the processing equipment. An undesirably thicker product results from slower initial cooling. In one practice, by way of non-limiting example, the initial cooling is effected within a minute of homogenization.

The cooled mixture resulting from the preceding step is subjected to freezing and aeration. The aeration is sufficient to attain an overrun typically ranging within 100% to 200%.

The freezing and aeration can, for example, be performed with a conventional ice cream freezer which whips the product while dropping its temperature to below freezing. The whipping and freezing operation is continued until the product has attained the desired specific gravity at a temperature below 24° F., preferably in the range of 15° F. to 20° F. The product is removed from the equipment at this temperature and packaged, after which the packaged product is hardened by reducing the temperature to below 0° F. The freezing and whipping operation can include the injection of gas. The gas can, by way of non-limiting example, be air, nitrogen, carbon dioxide, nitrous oxide or a combination of these gaseous fluids. The whipping and freezing step can also be performed by whipping the product to the desired specific gravity within the range stated, typically in the commercially known Oakes brand or Votator brand high-shear whipping equipment, and then blast freezing the whipped product to accomplish the freezing and hardening process in one step. The latter operation can also be carried out with the noted injection of gas under pressure.

The resultant product, with the composition and overrun described, is extrudable and coneable as discussed above, has good taste and mouth feel, and is low in caloric and in cholesterol content. It accordingly meets the required and desired properties for a dietetic soft serve dessert for dispensing directly from home freezer storage. The package for the product can be a closed envelope with an extrusion nozzle and which the consumer can squeeze to subject the dessert to pressure which extrudes the product from the nozzle, much in the way that conventional soft serve is extruded from a commercial freezer. But the new dessert of this invention possesses these properties at home freezer temperatures, whereas conventional soft serve is dispensed at significantly higher temperatures.

EXAMPLE 1

One example of the new dietetic dessert formulated and processed in the foregoing manner for practice of the invention is prepared in the foregoing manner with the following ingredients (weight percent).

10.5% milk solid not fat (MSNF), provided as skim milk
3.5% modified whey protein, for example Fortein 35 as marketed by Foremost Foods
4.0% fructose, for example crystalline fructose as marketed by the Hoffman-LaRoche Company
12.5% sorbitol
10.0% 36 DE corn syrup solids, for example Star Dri 35R as marketed by A. E. Staley Co.
0.8% glycerine
0.5% microcrystalline cellulose, for example Avicel RC581 as marketed by FMC
0.35% gelatin (225 Bloom)
0.12% locust bean gum, for example FL 70/50 as marketed by Hercules Company
0.08% guar gum, for example Hercules FG 60/70

0.45% distilled mono-glyceride, for example Myverol 1804 as marketed by the Eastman Chemical Division of Kodak
0.26% mono- and di-glycerides, for example Durem 207 as marketed by the Durkee Company
0.065% Polysorbate 80
0.018% Carrageenan, for example Hercules Genulacta L100
0.2% salt (NaCl)

The balance of the product is water. Hence the total solids are 43.34% by weight and water accounts for 56.64%. The salt is present primarily as a flavor enhancer and, although preferable, is considered an optional ingredient.

The dietetic product was prepared as described, with an overrun on the order of 165%. After hardening and subsequent storage in a home freezer, the product extruded readily and was coneable. The product was, however, softer than preferred. Accordingly, a second sample was prepared without glycerine.

EXAMPLE 2

10.5% MSNF
3.5% modified whey protein
4.3% fructose
12.2% sorbitol
7.0% 36 DE corn syrup solids
3.8% 24 DE corn syrup solids
0.5% microcrystalline cellulose
0.35% gelatin (225 Bloom)
0.12% locust bean gum
0.08% guar gum
0.45% distilled mono-glyceride
0.26% mono- and di-glycerides
0.065% Polysorbate 80
0.0135% Carrageenan
0.2% salt
balance water The product, prepared with an overrun in the order of 165%, was, as desired, harder at 0°–10° F. than that of Example 1. It extruded well, and exhibited better coneability and better mouth feel.

The dietetic desserts of Examples 1 and 2 are unflavored and can, as stated, be flavored with vanilla, for example, using a concentrate that is present in only a small amount by weight. Other flavorings can be added in larger amounts, with appropriate changes in the amounts of other ingredients.

CALORIC TEST EXAMPLE

More extensive tests of the organoleptic and the rheological properties of soft serve-like frozen foods extrudable and coneable at home freezer temperatures have been conducted with a product similar in some respects to the dietetic product of this invention but having an edible fat ingredient. This frozen dessert, designated below as "caloric" to distinguish it from the dietetic product of Examples 1 and 2, was prepared with the following ingredients in the manner described above, taking into account the fat ingredient.

11% fat, provided as butter fat
11% MSNF, provided as milk and milk powder
3% fructose, provided as crystalline fructose as marketed for example by the Hoffman-LaRoche Company
10.8% sorbitol
10.0% corn syrup solids, for example Star Dri 35R as marketed by A. E. Staley Co.

0.25% microcrystalline cellulose, for example Avicel RC581 as marketed by FMC Corporation
0.15% gelatin (Bloom strength 225)
0.07% locust bean gum, for example FL 70/50 as marketed by Hercules Company
0.05% guar gum, for example Hercules FG 60/70
0.02% carrageenan, for example Hercules Genulacta L100
0.4% mono- and diglycerides, for example Durem 207 as marketed by the Durkee Company
0.05% polysorbate 80

The balance of the product was water.

The caloric product was prepared as described, with an overrun between 160% and 200%, and with 0.2% by weight table salt (NaCl), principally as a flavor enhancer.

Consumer testing of the resultant caloric dessert has verified that it is at least comparable, if not superior, to presently available commercial soft serve. The caloric dessert has been lauded as creamy, smooth and free of burn. Moreover, the dessert well satisfies the desired deformation and flow properties at home freezer temperatures as discussed above, as well as withstanding prolonged freezer storage. The caloric product accordingly is indeed readily extrudable, as a continuous extrudate, by hand pressure on a collapsible pliable container, immediately upon removal from prolonged storage in a home freezer.

Laboratory tests support the attainment of new and different material properties with the caloric dessert, and are believed also attained with the dietetic product of this invention. The caloric dessert when prepared with an overrun in the order of 200%, was measured to have a moderately low yield value and a relatively high resistance to lateral deformation. It also exhibited an unusually short relaxation time, which is considered to facilitate extrusion to a cone or dish, even by a first time user of the new dessert. In particular, a measurement comparing the caloric dessert at 0° F. with conventional soft serve at 20° F. determined that the relaxation time of the caloric dessert is on the order of ten times shorter than that of conventional soft serve. In one particular measurement, for example, the new caloric dessert exhibited a relaxation time on the order of two seconds, whereas the conventional product, at the higher temperature at which it operates, exhibited a relaxation time on the order of twenty-five seconds. These tests included conventional ice cream at the store freezer temperature of 0° F., but that product was not extrudable under reasonable pressures and hence no corresponding measurement was obtained of relaxation time.

Viscosity and shear thinning tests on the caloric dessert of the Test Example revealed that the viscosity of the food product, at 0° F., dropped by a factor on the order of two hundred between the unstressed condition and the stress required to obtain extrusion through a 0.62-inch diameter orifice. In the unstressed condition the viscosity was, as desired, sufficiently high to preclude unwanted flow from the extrusion container and to be coneable after recovery from extrusion. The test also established that the caloric food product is remarkably shear thinning at 0° F.

A series of standard laboratory cone penetrometer measurements was performed on the foregoing caloric dessert, conventional soft serve, and two different ice creams, one a standard supermarket brand and the other a frozen pudding which contains alcohol. The caloric dessert product exhibited the lowest yield strength. The measured penetration distances were converted to yield values according to the standard formula $$Y = KL/Z^{1.6}$$

where Y is the yield value in grams per square centimeter, L is the applied cone load in grams, Z is the measured penetration in 1/10 millimeter units, and K is a constant for the particular cone angle.

The accompanying drawing is a semi-log plot of the yield values obtained in this manner for each of the four samples as a function of the temperatures at which the measurements were made. It is noteworthy that the caloric product, as desired, exhibits a yield value, at the home-freezer temperature range at which it is to be extruded, of the same order of magnitude as the yield value of conventional soft serve at the higher, i.e. 16° F. to 21° F., temperatures at which it is extruded.

A further test determined that the caloric dessert of the Test Example has flow and deflection properties distinctly different from those of conventional soft serve, as well as from conventional supermarket ice cream. The test was conducted with the caloric dessert and with the ice cream at household freezer temperatures, i.e. 0° F., and with the conventional soft serve at the standard extrusion temperature of 20° F. The supermarket ice cream fractures, rather than bends, when subjected to gravity or other loading force. Conventional soft serve exhibits progressive plastic bending under these conditions. It hence deforms progressively until the load is removed. The new caloric dessert, on the other hand, exhibits a distinctly elastic deformation, but of relatively small magnitude. Further, the tests indicate that the caloric dessert is plastic while under the shear loading for extrusion, but reverts quickly to elastic behavior when the load is removed. Conventional soft serve, on the other hand, appears to be plastic under all loading conditions when in the normal extrusion temperature range of 16° F. to 21° F.

In a further test on a chocolate flavored variation of the Caloric Test Example, samples were initially hardened, subjected to prolonged tempering, i.e. at temperatures not lower than 15° F. for over eighty hours, and then re-hardened. Samples that underwent the full tempering period appeared identical to samples that were subjected to shorter tempering and to samples that were maintained throughout at the hardened condition. The samples thus withstood the tempering, which is considered similar to that likely to be incurred in commercial distribution, without any appreciable deterioration, including without loss of volume, loss of the fine air cell structure, or loss of the fine ice crystal structure.

Extrusion of the dietetic product of Examples 1 and 2 and of the foregoing caloric product from a collapsible package and coiling the continuous extrudate onto a cone has demonstrated that the ease of extrusion, the shear-responsive fluidity, the relaxation time and the lateral resistance for successful coneability exist to a similar extent with both the dietetic and the caloric products. These observations and demonstrations indicate that the rheological properties of the caloric dessert, as the foregoing measurements exemplify, are comparable to those of the dietetic frozen food.

It will thus be seen that the objects set forth above, including those made apparent from the preceding description, are efficiently attained. Since certain changes may be made in the composition and the product set forth, and in carrying out the foregoing process without departing from the scope of the invention, it is intended that all matter contained in the above description and shown in the accompanying drawing be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A whipped, emulsified frozen food of low fat content extrudable in continuous form and coneable at temperatures at least in the range of 0° to 10° F. for serving by extrusion at home freezer temperatures, consisting essentially, in unflavored form, of a controlled emulsion of protein, water, sugars, stabilizers, and emulsifiers, said protein accounting for substantially 3% to 7% by weight of the product, said water accounting for substantially 53% to 60% by weight of the product, said sugars accounting for substantially 25% to 29% by weight of the product, and said emulsifiers and stabilizers accounting for substantially 1.1% to 2.7% by weight of the product.

2. A frozen food as defined in claim 1, further characterized in that said sugars include plural sugars selected from the group consisting of fructose, sorbitol, corn syrup, sucrose, dextrose and mannitol, starch hydrolysates, invert sugars, honey and xylitol.

3. A frozen food as defined in claim 1, further characterized in that said stabilizers include water binding, gelling, and blocking agents, and said emulsifiers include whipping and drying agents.

4. A frozen food as defined in claim 1, further characterized in that said stabilizers include a water binding agent selected from the group consisting of locust bean gum, guar gum, propylene glycol alginate, tara gum, and cellulose ethers, a gelling agent selected from the group consisting of gelatin, xanthan gum, carrageenan, sodium alginate and pectin, and an insoluble blocking agent selected from the group consisting of blocking stabilizers in the foregoing water binding and gelling groups and microcrystalline cellulose and cellulose fibers.

5. A frozen food as defined in claim 1, further characterized in that said emulsifiers include a whipping agent selected from the group consisting of mono- and diglycerides and distilled monoglycerides, and a drying agent selected from the group consisting of polysorbate 80, polysorbate 65, and ethoxylated mono- and diglycerides.

6. A frozen food as defined in claim 1, further characterized in that said emulsifiers include mono- and/or diglycerides and are present in an amount from substantially 0.4% to 1.2% by weight of the product and effective to control the emulsification of said product and to provide said extrudability and coneability of said product, and said stabilizers include from about 0.2% to 0.5% by weight of the product of gelling agents, and are present in an amount effective to provide said product with significant resistance to thermal shocks and to provide substantial mouth-feel, body and chewiness.

7. A whipped, emulsified frozen low-fat dessert product extrudable in continuous form and coneable at temperatures at least in the range of 0° to 10° F. for serving by extrusion at home freezer temperatures, consisting essentially, in unflavored form, of a controlled emulsion of protein, water, sugars, stabilizers, and emulsifiers, said protein accounting for substantially 3% to 7% by weight of the product, said water accounting for substantially 53% to 60% by weight of the product, said sugars accounting for substantially 25% to 29% by weight of the product, said emulsifiers, with said other ingredients, controlling the emulsification of said product for attaining said extrudability and said coneability, and said stabilizers, with said other ingredients, providing said product with significant resistance to thermal shock, and with substantial mouth-feel, body and chewiness, and attaining said extrudability and said coneability.

8. A dessert product as defined in claim 7, further characterized by having an overrun at least on the order of 100%.

9. A dessert product as defined in claim 7, further characterized in that said sugars include plural sugars selected from the group consisting of fructose, sorbitol, corn syrup, sucrose, dextrose and mannitol, starch hydrolysates, invert sugars, honey and xylitol.

10. A dessert product as defined in claim 7, further characterized in that said stabilizers include a water binding agent selected from the group consisting of locust bean gum, guar gum, propylene glycol alginate, tara gum, and cellulose ethers, a gelling agent selected from the group consisting of gelatin, xanthan gum, carrageenan, sodium alginate and pectin, and an insoluble blocking agent selected from the group consisting of blocking stabilizers in the foregoing water binding and gelling groups and microcrystalline cellulose and cellulose fibers.

11. A dessert product as defined in claim 7, further characterized in that said emulsifiers include a whipping agent selected from the group consisting of mono- and diglycerides and distilled monoglycerides, and a drying agent selected from the group consisting of polysorbate 80, polysorbate 65, and ethoxylated mono- and diglycerides.

12. A dessert product as defined in claim 7, further characterized in that said emulsifiers include mono- and/or diglycerides and are present in an amount from substantially 0.4% to 1.2% by weight of the product and effective to control the emulsification of said product and to provide said extrudability and coneability of said product, and said stabilizers include from about 0.2% to 0.5% by weight of the product of gelling agents, and are present in an amount effective to provide said product with significant resistance to thermal shocks and to provide substantial mouth-feel, body and chewiness.

13. A whipped, emulsified frozen low-fat dessert product consisting essentially, in unflavored form, of a controlled emulsion of protein, water, sugars, stabilizers, and emulsifiers.

said protein accounting for substantially 3% to 7% by weight of the product, said water accounting for substantially 53% to 60% by weight of the product, said sugars accounting for substantially 25% to 29% by weight of the product, said stabilizers including at least a water binding agent, a gelling agent, and a blocking agent, said emulsifiers including at least a whipping agent and a drying agent, said product having a yield value, as determined at 0° F. by penetrometer measurement, lower than that of conventional ice cream at the same temperature, and substantially the same as or less than that of conventional soft serve at a temperature of 16° F., and said product being extrudable in continuous form and coneable at temperatures at least in the range of 0° to 10° F. for serving by extrusion at home freezer temperatures.

14. A whipped, emulsified frozen low-fat dessert product having an overrun at least on the order of 100%, and extrudable in continuous form and coneable at temperatures at least in the range of 0° to 10° F. for serving by extrusion at home freezer temperatures, consisting essentially, in unflavored form, of a controlled emulsion of protein, water, sugars, stabilizers, and emulsifiers, said protein being present in an amount from substantially 3% to 7% by weight of the product, said water being present in an amount from substantially 53% to 60% by weight of the product, said sugars being present in an amount from substantially 25% to 29% by weight of the product, said emulsifiers including mono- and/or diglycerides and being present in an amount from substantially 0.4% to 1.2% by weight of the product and effective to control the emulsification of said product and to provide said extrudability and coneability of said product, and said stabilizers including from about 0.2% to 0.5% by weight of the product of gelling agents, and being present in an amount effective to provide said product with significant resistance to thermal shocks and to provide substantial mouth-feel, body and chewiness.

* * * * *